US010386497B2

(12) United States Patent
Ashjaee

(10) Patent No.: US 10,386,497 B2
(45) Date of Patent: Aug. 20, 2019

(54) AUTOMATED LOCALIZATION FOR GNSS DEVICE

(71) Applicant: JAVAD GNSS, Inc., San Jose, CA (US)

(72) Inventor: Javad Ashjaee, Saratoga, CA (US)

(73) Assignee: Javad GNSS, Inc., San Jose, CA (US)

( * ) Notice: Subject to any disclaimer, the term of this patent is extended or adjusted under 35 U.S.C. 154(b) by 869 days.

(21) Appl. No.: 14/505,235

(22) Filed: Oct. 2, 2014

(65) Prior Publication Data

US 2015/0100269 A1  Apr. 9, 2015

Related U.S. Application Data

(60) Provisional application No. 61/888,417, filed on Oct. 8, 2013.

(51) Int. Cl.
*G01S 19/42* (2010.01)
*G01S 19/39* (2010.01)

(52) U.S. Cl.
CPC ............. *G01S 19/42* (2013.01); *G01S 19/39* (2013.01)

(58) Field of Classification Search
CPC ....... G01S 19/42; G01B 11/005; G01B 21/04; G01C 21/20; G01V 2210/40; G01V 1/32
See application file for complete search history.

(56) References Cited

U.S. PATENT DOCUMENTS

| 4,866,629 A | * | 9/1989 | Chen ................. G05B 19/4205 348/94 |
| 4,899,161 A | * | 2/1990 | Morin, Jr. ............... G01S 13/91 342/180 |
| 8,022,868 B2 | | 9/2011 | Yudanov et al. |
| 8,094,087 B2 | | 1/2012 | Ashjaee et al. |
| 8,120,527 B2 | | 2/2012 | Ashjaee et al. |
| 8,125,376 B1 | | 2/2012 | Ashjaee et al. |
| 8,169,379 B2 | | 5/2012 | Zhukov et al. |
| 8,224,525 B1 | | 7/2012 | Rapoport et al. |
| 8,315,478 B2 | * | 11/2012 | Viswanathan ............ G03F 1/68 382/151 |
| 8,606,498 B2 | | 12/2013 | Pesterev et al. |
| 8,717,232 B2 | | 5/2014 | Ashjaee et al. |
| 8,717,233 B2 | | 5/2014 | Ashjaee et al. |
| 8,872,700 B2 | | 10/2014 | Ashjaee et al. |

(Continued)

*Primary Examiner* — Elias Desta
(74) *Attorney, Agent, or Firm* — Morrison & Foester LLP

(57) ABSTRACT

Systems and methods for performing automated localization are provided. In one example method, a plurality of coordinates representing positions of a plurality of locations may be received. The plurality of coordinates may be from two or more different coordinate systems. The numerical values of each of the plurality of coordinates may be evaluated to determine the coordinate system to which the coordinate belongs. The coordinates may be grouped into sets of coordinates based on their determined coordinate systems. Coordinates from one coordinate system may be paired with coordinates that represent the same locations from another coordinate system. A shape matching algorithm may be used to determine coordinates from different systems that represent the same locations. A localization process may then be used to convert the coordinates of the first coordinate system into coordinates of the second coordinate system based on the paired coordinates.

21 Claims, 6 Drawing Sheets

(56) References Cited

U.S. PATENT DOCUMENTS

| | | |
|---|---|---|
| 2011/0075886 A1 | 3/2011 | Ashjaee et al. |
| 2011/0231057 A1 | 9/2011 | Ashjaee et al. |
| 2012/0229333 A1 | 9/2012 | Ashjaee et al. |
| 2012/0299936 A1 | 11/2012 | Ashjaee et al. |
| 2013/0080051 A1 | 3/2013 | Gribkov et al. |
| 2014/0062778 A1 | 3/2014 | Ashjaee et al. |
| 2014/0077865 A1 | 3/2014 | Ashjaee et al. |
| 2015/0054685 A1 | 2/2015 | Ashjaee |

\* cited by examiner

AUTOMATED LOCALIZATION FOR GNSS DEVICE

CROSS-REFERENCE TO RELATED APPLICATION

This application claims priority from U.S. Provisional Ser. No. 61/888,417, filed on Oct. 8, 2013, entitled AUTOMATED LOCALIZATION FOR GNSS DEVICE, which is hereby incorporated by reference in its entirety for all purposes.

BACKGROUND

1. Field

The present disclosure relates to Global Navigation Satellite System (GNSS) devices and, more specifically, to performing localization using a GNSS device.

2. Related Art

Navigation receivers that use global navigation satellite systems, such as GPS or GLONASS (hereinafter collectively referred to as "GNSS"), enable a highly accurate determination of the position of the receiver. The satellite signals may comprise carrier signals that are modulated by pseudo-random binary codes and that, on the receiver side, may be used to measure the delay relative to a local reference clock. These delay measurements may be used to determine the pseudo-ranges between the receiver and the satellites. The pseudo-ranges are not true geometric ranges because the receiver's local clock may be different from the satellite onboard clocks. If the number of satellites in sight is greater than or equal to four, then the measured pseudo-ranges can be processed to determine the user's single point location as represented by a vector $X=(x, y, z)^T$, as well as to compensate for the receiver clock offset.

In geodetic applications, many different coordinate systems may be used. For example, in GPS applications based on the WGS-84 coordinate system (which is a so called "Earth-Center Earth-Fixed" coordinate system), coordinates for locations may be defined using an X, Y, Z Cartesian axis centered about the center of the Earth. Other systems, such as the North American Datum 85 (NAD-85) coordinate system, may implement semi-localized Latitude-Longitude-Altitude coordinate systems. There are also "State Plane" coordinate systems that project portions of the Earth onto flat surfaces called "zones." For example, each state in United States may be represented by one or more zones. In these systems, over 3,000 such flat Earth projections exist world-wide.

In many geodetic applications (e.g., stakeout), designers of roads, buildings, or the like, may generate their designs using computer-aided design (CAD) tools that identify locations of points using an arbitrary coordinate system (referred to herein as a "local system"). For example, the CAD tools may use a North-East-Up flat Earth coordinate system having an arbitrary center (e.g., 0, 0, 0). When the design is transferred from the computer to a real-world location, the locations within the arbitrary coordinate system of the CAD tool may be converted into corresponding locations within the geodetic system that will be used (e.g., WGS-84, NAD-85, a State Plane coordinate system, or the like) (referred to herein as an "actual system"). The process of converting locations within the local system to the actual system is often referred to as "localization."

In some example localization processes, three or more locations within the local system may be surveyed to determine their corresponding locations within the actual system. Typically, users are required to manually generate the three or more local-actual pairs by selecting locations within the local system and their corresponding locations within the actual system from a list of locations. Using the generated local-actual pairs, a localization process can be used to covert locations within the local system into locations within the actual system.

While the manual process of selecting local-actual pairs can be used to effectively provide the input necessary for many localization processes, it can be a time-consuming and confusing process for the user. For instance, conventional software applications may require the user to specify the local locations, specify the actual locations, and then manually pair the local and actual locations.

BRIEF SUMMARY

Systems and methods for performing automated localization are provided. In one example method, a plurality of coordinates representing positions of a plurality of locations may be received. The plurality of coordinates may be from two or more different coordinate systems. The numerical values of each of the plurality of coordinates may be evaluated to determine the coordinate system to which the coordinate belongs. The coordinates may be grouped into sets of coordinates based on their determined coordinate systems. Coordinates from one coordinate system may be paired with coordinates that represent the same locations from another coordinate system. A shape matching algorithm may be used to determine coordinates from different systems that represent the same locations. A localization process may then be used to convert the coordinates of the first coordinate system into coordinates of the second coordinate system based on the paired coordinates.

In the following description, reference is made to the accompanying drawings which form a part thereof, and which illustrate several embodiments of the present disclosure. It is understood that other embodiments may be utilized and structural and operational changes may be made without departing from the scope of the present disclosure. The use of the same reference symbols in different drawings indicates similar or identical items.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention as claimed. Thus, the various embodiments are not intended to be limited to the examples described herein and shown, but are to be accorded the scope consistent with the claims.

Systems and methods for performing automated localization are provided. In one example method, a plurality of coordinates representing positions of a plurality of locations may be received. The plurality of coordinates may be from two or more different coordinate systems. The numerical values of each of the plurality of coordinates may be evaluated to determine the coordinate system to which the coordinate belongs. The coordinates may be grouped into sets of coordinates based on their determined coordinate systems. Coordinates from one coordinate system may be paired with coordinates that represent the same locations from another coordinate system. A shape matching algorithm may be used to determine coordinates from different systems that represent the same locations. A localization process may then be used to convert the coordinates of the first coordinate system into coordinates of the second coordinate system based on the paired coordinates.

Figure 1:
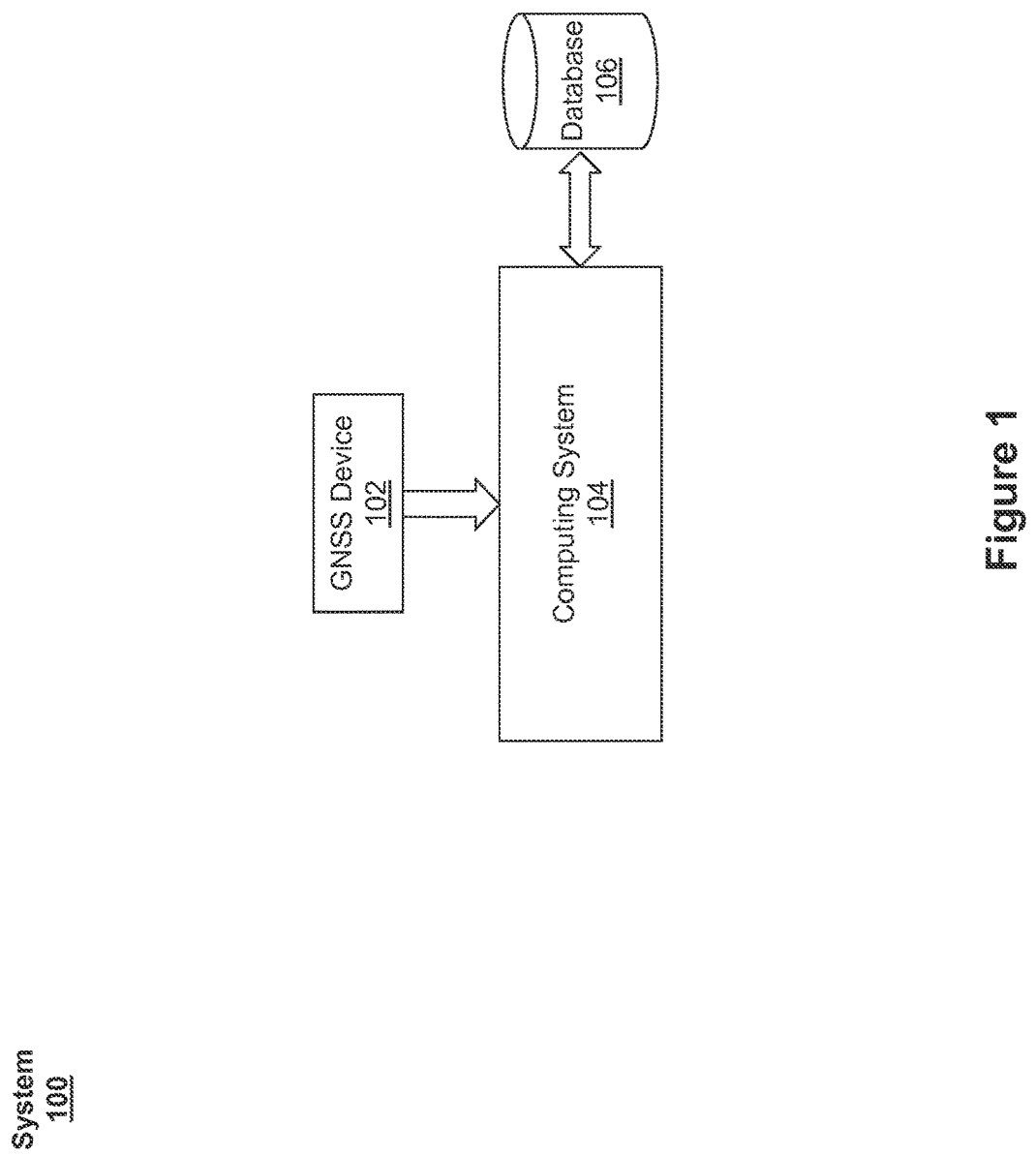
FIG. 1 illustrates a block diagram of an exemplary system for performing an automated localization process according to various examples.

FIG. 1 illustrates a block of an example system 100 for performing an automated localization process according to various examples. System 100 can include a GNSS device 102 configured to receive GNSS satellite signals and to convert those signals into coordinates within an actual system (e.g., WGS-84, ECEF, ENU, NAD-85, or the like). GNSS device 102 can be communicatively coupled via a wired or wireless communication interface with computing system 104 to provide computing system 104 with the received GNSS signals and/or converted actual system coordinates for processing. Computing system 104 may be configured to store the received GNSS signals and/or actual coordinates for locations in one or more local or remote databases 106. Database 106 may further store coordinates for locations from a local system, such as a coordinate system for a CAD tool executed by computing system 104. As will be described in greater detail below, computing system 104 may be configured to perform an automated localization process using the actual coordinates received from GNSS device 102 and the local coordinates received from database 106.

In some examples, GNSS device 100 may be a portable handheld geodesic device, such as that described in U.S. Patent Publication No. 2012/0299936 or U.S. Pat. No. 8,125,376, which are incorporated by reference herein in their entirety for all purposes.

While shown as being separate, it should be appreciated that GNSS device 102, computing system 104, and database 106 may be included within a single device or may be separated into more than one device.

Figure 2:
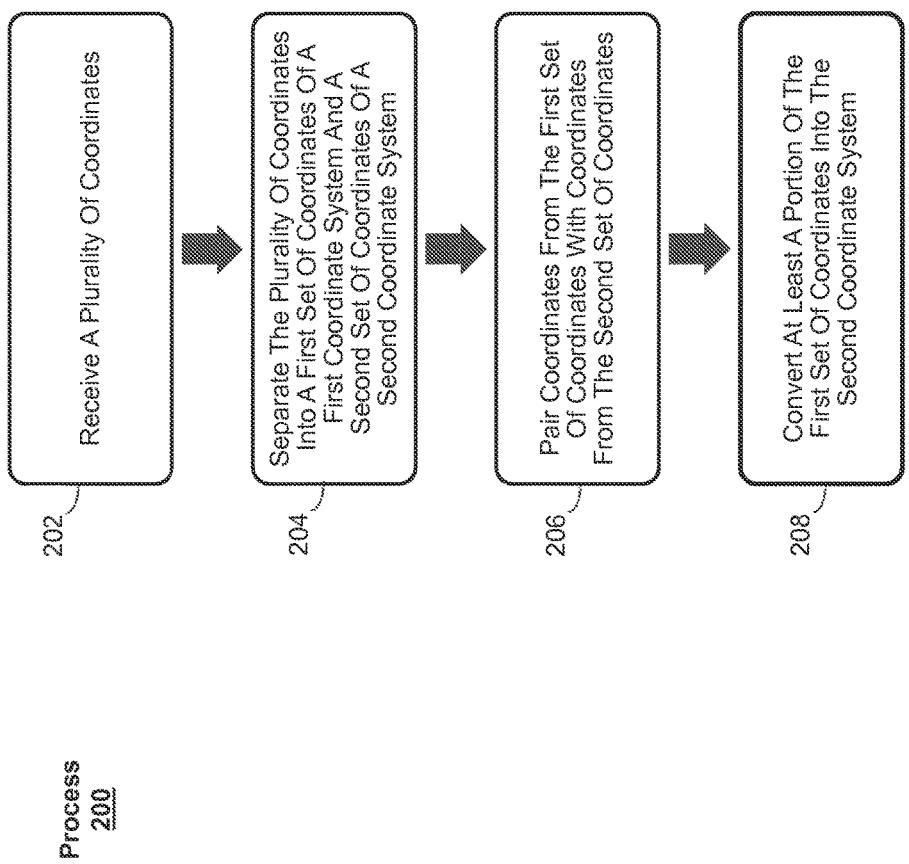
FIG. 2 illustrates an exemplary automated localization process according to various examples.

FIG. 2 illustrates an exemplary automated localization process 200 according to various examples. Process 200 may be performed using a system similar or identical to system 100.

At block 202, coordinates for multiple locations may be received. Each coordinate may include multiple numerical values representing the position of the location within the corresponding coordinate system. The coordinates may be received by a computing system similar or identical to computing system 104 and may include coordinates for any number of locations from any number of local or actual coordinate systems. For example, the coordinates for some of the locations may be from an actual coordinate system, such as WGS-84, ECEF, ENU, NAD-85, or the like, while the coordinates for other locations may be from a local coordinate system, such as that from a CAD tool using a North-East-Up flat Earth coordinate system having an arbitrary center (e.g., 0, 0, 0). In some examples, the coordinates of the local system(s) may be received from a database similar or identical to database 106 used to store locations for a CAD tool or other software application. The coordinates for locations from the actual coordinate system(s) may be received from a GNSS device similar or identical to GNSS device 102 that was used to measure the locations and that generated the coordinates using received GNSS satellite signals. In other examples, the locations from the actual coordinate system may be received from a computing device that converted the GNSS satellite signals received by a GNSS device into the coordinates of the actual coordinate system or an associated database.

While example coordinate systems are provided above, it should be appreciated that the received coordinates may be from any coordinate system. Moreover, the coordinates may be received from any local or remote database or computing device.

At block 204, the coordinates may be separated into a first set of coordinates of a first coordinate system and a second set of coordinates of a second coordinate system. Block 204 may be performed by a computing system similar or identical to computing system 104 and may include evaluating the numerical values of the coordinates received at block 202. In some examples, the first coordinate system may be a local coordinate system, such as a coordinate system used by a CAD tool, while the second coordinate system may be an actual coordinate system, such as WGS-84, ECEF, ENU, NAD-85, or the like. In other examples, the first and second coordinate systems may be any other desired coordinate systems. Based on the numerical values for each coordinate, the coordinate system from which the set of coordinates originated may be determined and the coordinates may be grouped into sets of coordinates with other coordinates of the same coordinate system. When evaluating the numerical values of the coordinates, the sign (positive or negative) of the values, magnitude of values, units associated with the values, value relative to values of the other coordinates, or any other characteristic may be processed to determine the coordinate system to which the coordinate belongs.

While block 204 is described above as separating the coordinates into two sets of coordinates of two different coordinate systems, it should be appreciated that the coordinates may be separated into any number of sets depending on the number of coordinate systems of the coordinates received at block 202. Moreover, in some examples, the coordinates may be identified as being from a particular coordinate system when received at block 202. For instance, a first set of coordinates may be received from a GNSS device and may be identified as being from the WGS-84 coordinate system and a second set of coordinates may be received from a CAD tool and may be identified as being from a local coordinate system. In these examples, block 204 need not be performed.

At block 206, coordinates from the first set of coordinates may be paired with coordinates from the second set of coordinates. The paired coordinates may represent positions of the same location within the different coordinate systems. For example, a coordinate from the first set of coordinates representing the position of a corner of a building within the coordinate system of the CAD tool may be paired with a coordinate from the second set of coordinates representing the position of the same corner of the same building within the actual coordinate system (e.g., within the WGS-84 coordinate system). Block 206 may be performed by a computing system similar or identical to computing system 104 and may include matching shapes represented by coordinates within the first set of coordinates with shapes represented by coordinates within the second set of coordinates. Since the relative angles, relative distances, and relative geometry of the locations represented by the coordinates of various coordinate systems remain constant, it may be inferred that coordinates of different coordinate systems that represent locations having the same or similar relative angles, relative distances, and relative geometry may represent positions of the same locations within the different coordinate systems. It should be appreciated that if the units of the coordinates from the different coordinate systems represent different distances, a conversion may be performed to match the distances represented by the coordinates. At block 206, all or a subset of shapes that can be created using three or more locations represented by coordinates of each coordinate system may be generated. The shapes resulting from one set of coordinates may be compared to the shapes resulting from the other set of coordinates to determine if the shapes are identical or within a threshold amount. The threshold amount can be selected based on measurement tolerances of the GNSS device or the like. Coordinates representing locations of a shape may be paired with their respective coordinate counterparts in a matching shape.

Figure 3:
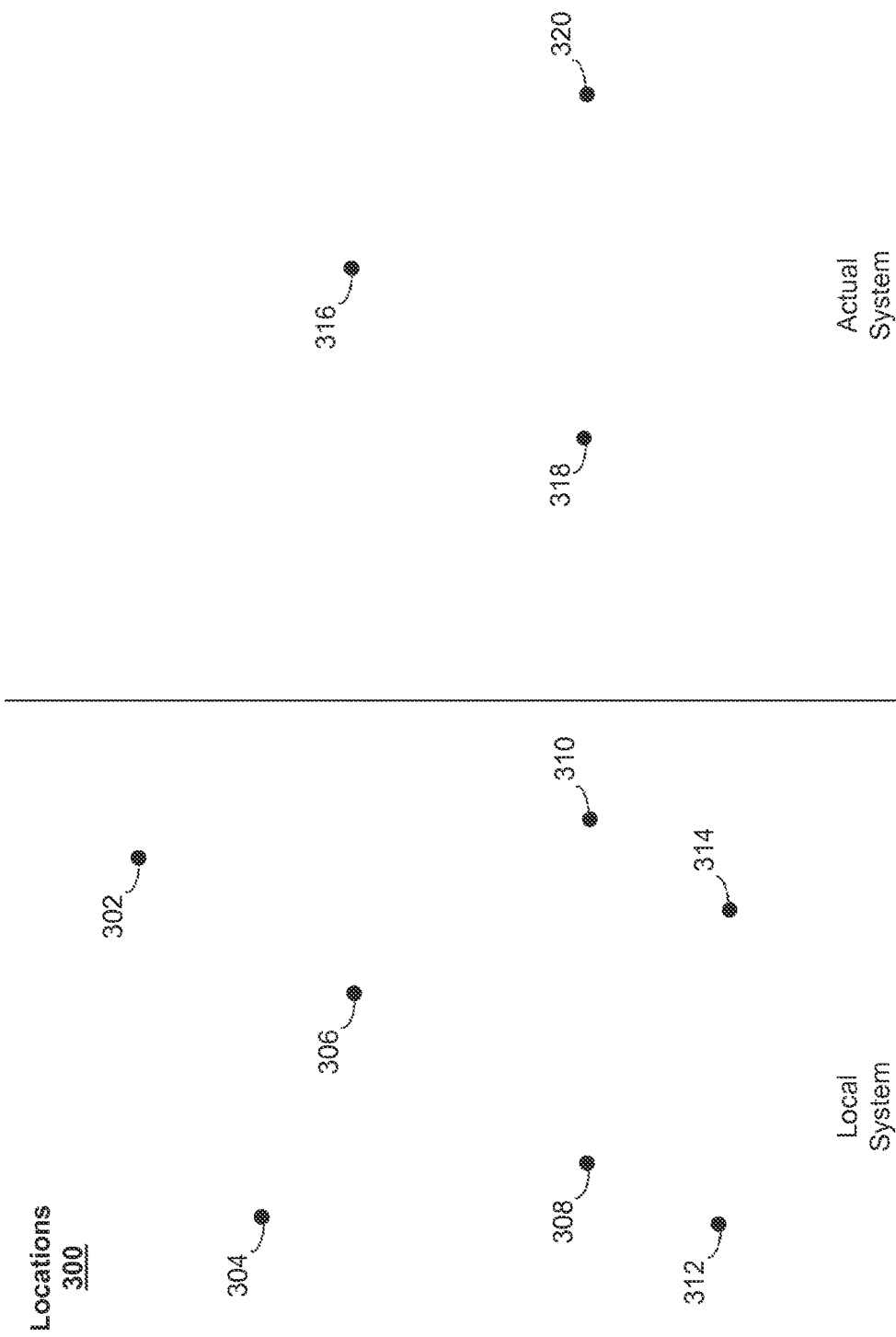
FIG. 3 illustrates exemplary sets of locations from different coordinate systems according to various examples.
Figure 4:
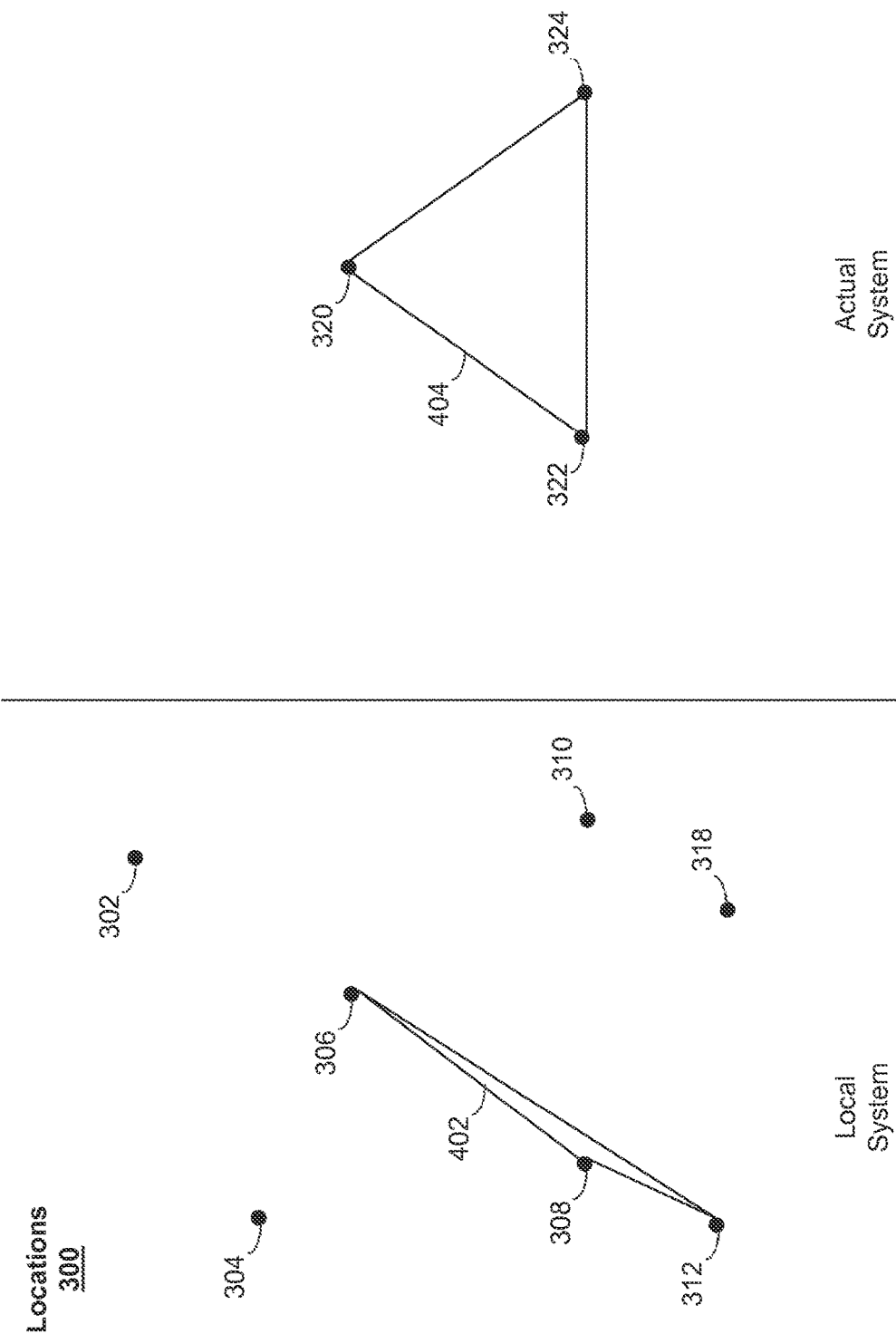
FIGS. 4 and 5 illustrate the matching of locations from different coordinate systems based on their shapes according to various examples.

To illustrate, FIG. 3 shows a visual representation of locations 300 that are represented by an example first set of coordinates of a local system and an example set of coordinates of an actual system. As shown, the coordinates from the first set of coordinates represent locations 302, 304, 306, 308, 310, 312, and 314, while the coordinates from the second set of coordinates represent locations 316, 318, and 320. The coordinates for the locations of FIG. 3 may have been received at block 202 of process 200 and separated into respective first and second sets of coordinates at block 204. At block 206, shapes generated by groups of three or more locations represented by each set of coordinates may be compared. This may include generating all or a subset of shapes that can be created using three or more locations represented by coordinates of each coordinate system. The shapes resulting from one set of coordinates may be compared to the shapes resulting from the other set of coordinates to determine if the shapes are identical or within a threshold amount. For example, the angles of each corner, orientation, and lengths of each side of the shapes may be compared to determine of those values are identical or within a threshold amount. FIG. 4 shows an example shape 402 generated using locations 306, 308, and 312 represented by coordinates of the local system and an example shape 404 generated using locations 320, 322, and 324 represented by coordinates of the actual system. Since these shapes are not identical and do not have angle, orientation, and length values within a threshold amount of each other, it may be determined that the shapes do not match and that the coordinates for locations 306, 308, and 312 do not correspond (e.g., represent the positions of the same locations) to the coordinates representing locations 320, 322, and 324.

Figure 5:
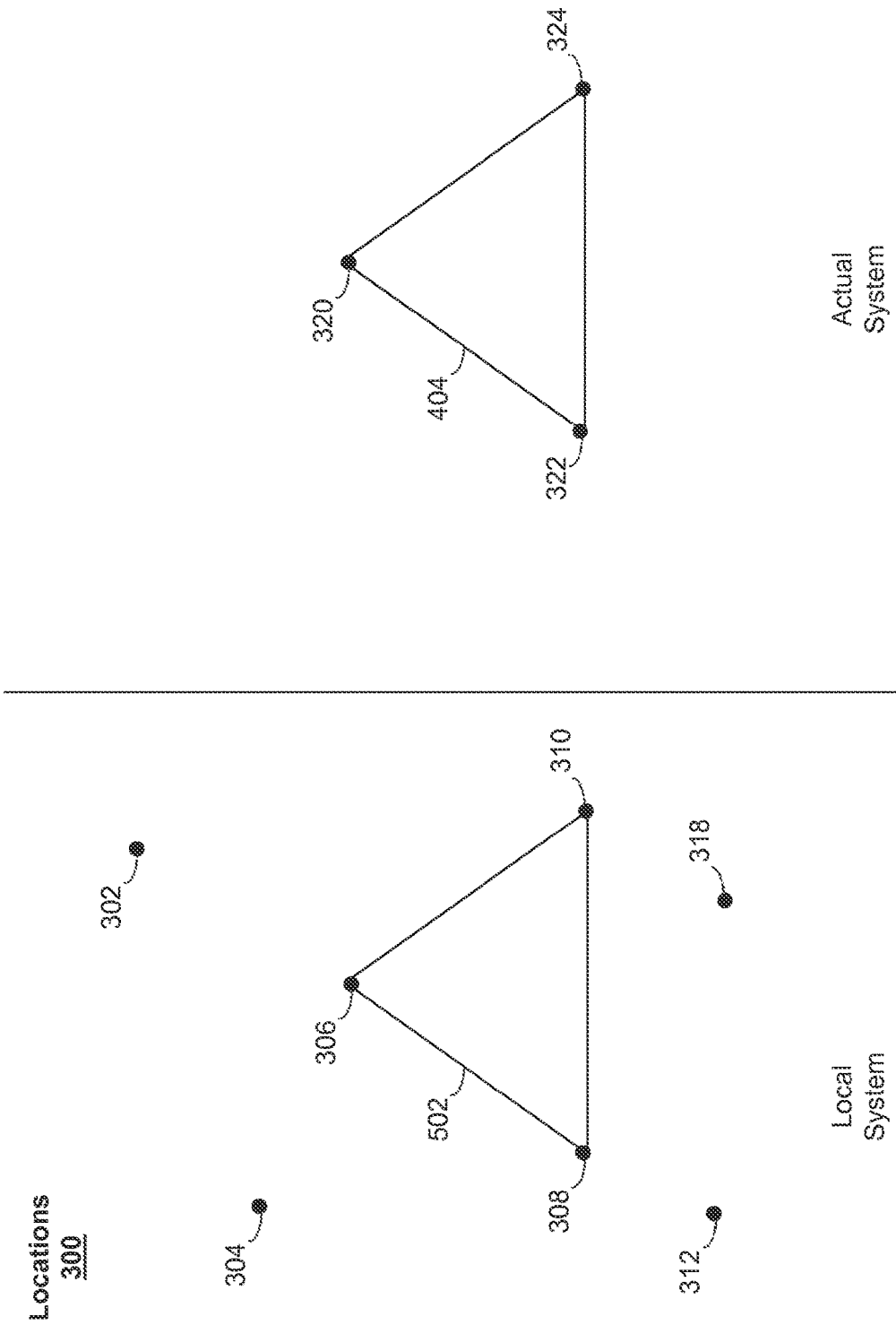

FIG. 5 shows another example shape 502 that may be generated using locations 306, 308, and 310 represented by coordinates of the local system and the example shape 404 generated using locations 320, 322, and 324 represented by coordinates of the actual system. In this example, these shapes are identical or have angle, orientation, and length values within a threshold amount of each other, so may be determined that the shapes match and that the coordinates for locations 306, 308, and 310 correspond (e.g., represent the positions of the same locations) to the coordinates representing locations 320, 322, and 324. As a result, the coordinate representing location 306 may be paired with the coordinate representing location 320, the coordinate representing location 308 may be paired with the coordinate representing location 322, and the coordinate representing location 310 may be paired with the coordinate representing location 324.

Referring back to FIG. 2, at block 208, at least a portion of the coordinates from the first set of coordinates may be converted into coordinates within the second coordinate system. This may be performed by a computing system similar or identical to computing system 104 and may include using the pairs of coordinates generated at block 206 to perform the conversion. Any known localization conversion algorithm may be used.

Using process 200, the localization process may be automated since the user is not required to manually pair coordinates of the first (e.g., local) coordinate system with coordinates of the second (e.g., actual) coordinate system. Instead, the computing device may initiate the process in response to any desired stimulus, such as a user request, receiving a sufficient number of coordinates of each coordinate system, or the like. This advantageously simplifies the localization process.

Figure 6:
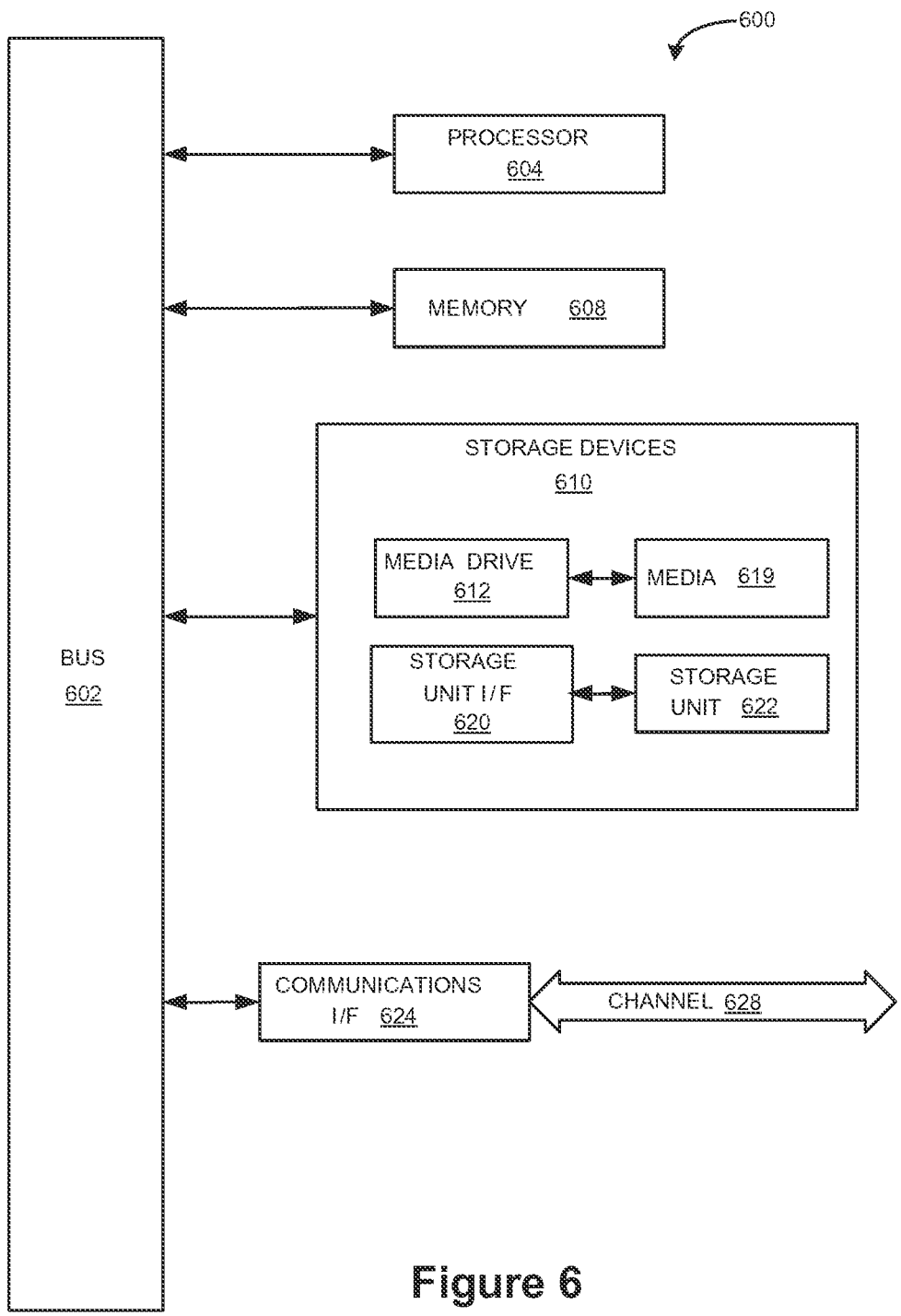
FIG. 6 illustrates an example computing system that may be employed to implement some or all of the processing functionality in certain examples.

FIG. 6 illustrates an exemplary computing system 600 that may be employed to implement processing functionality for various aspects of the current technology. For example, computing system 600 may be used to implement computing system 104 of system 100 and may be used to perform the steps of exemplary processes 200. Those skilled in the relevant art will also recognize how to implement the current technology using other computer systems or architectures. Computing system 600 may represent, for example, a user device, such as a desktop, mobile phone, geodesic device, and so on as may be desirable or appropriate for a given application or environment. Computing system 600 can include one or more processors, such as a processor 604. Processor 604 can be implemented using a general or special purpose processing engine such as, for example, a microprocessor, microcontroller or other control logic. In this example, processor 604 is connected to a bus 602 or other communication medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory ("ROM") or other static storage device coupled to bus 602 for storing static information and instructions for processor 604.

The computing system 600 may also include information storage mechanism 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 618 may include, for example, a hard disk, floppy disk, magnetic tape, optical disk, CD or DVD, or other fixed or removable medium that is read by and written to media drive 612. As these examples illustrate, the storage media 618 may include a non-transitory computer-readable storage medium having stored therein particular computer software or data.

In alternative embodiments, information storage mechanism 610 may include other similar instrumentalities for allowing computer programs or other instructions or data to be loaded into computing system 600. Such instrumentalities may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 622 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a USB port), a PCMCIA slot and card, etc. Software and data transferred via communications interface 624. Some examples of a channel 628 include a phone line, a cellular phone link, an RF link, a network interface, a local or wide area network, and other communications channels.

In this document, the terms "computer program product" and "non-transitory computer-readable storage medium" may be used generally to refer to media such as, for example, memory 608, storage media 618, or removable storage unit 622. These and other forms of non-transitory computer-readable storage media may be involved in providing one or more sequences of one or more instructions to processor 604 for execution. Such instructions, generally referred to as "computer program code" (which may be grouped in the form of computer programs or other groupings), when executed, enable the computing system 600 to perform features or functions of embodiments of the current technology.

In an embodiment where the elements are implemented using software, the software may be stored in a non-transitory computer-readable storage medium and loaded into computing system 600 using, for example, removable storage drive 622, media drive 612 or communications interface 624. The control logic (in this example, software instructions or computer program code), when executed by the processor 604, causes the processor 604 to perform the functions of the technology as described herein.

It will be appreciated that, for clarity purposes, the above description has described embodiments with reference to different functional units and processors. However, it will be apparent that any suitable distribution of functionality between different functional units, processors, or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements, or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A computer-implemented method for converting coordinates of one coordinate system to another, the method comprising:
   receiving, by a Global Network Satellite System (GNSS) device, GNSS signals from a plurality of GNSS satellites;
   converting the GNSS signals into a first plurality of coordinates representing positions for a plurality of locations associated with the GNSS device;
   receiving, by a processor, a second plurality of coordinates comprising the first plurality of coordinates representing positions for a plurality of locations associated with the GNSS device;
   separating the second plurality of coordinates into a first set of coordinates of a first coordinate system and a second set of coordinates of a second coordinate system;
   generating pairs of coordinates from the first set of coordinates with coordinates from the second set of coordinates that represent positions for the same locations associated with the GNSS device;
   converting at least a portion of the first set of coordinates into coordinates of the second coordinate system based on the paired coordinates; and
   storing the converted coordinates on the GNSS device.

2. The method of claim 1, wherein separating the plurality of coordinates into the first set of coordinates and the second set of coordinates comprises evaluating the numerical values of the plurality of coordinates.

3. The method of claim 2, wherein evaluating the numerical values of the plurality of coordinates comprises evaluating one or more of the sign of a first numerical value, the magnitude of the first numerical value, the unit associated with the first numerical value, and the value of the first numerical value relative to the value of a second numerical value.

4. The method of claim 1, wherein converting at least a portion of the first set of coordinates into coordinates of the second coordinate system based on the paired coordinates comprises performing a localization process using the generated pairs of coordinates.

5. The method of claim 1, wherein converting at least a portion of the first set of coordinates into coordinates of the second coordinate system is performed in response to a user request to convert the at least a portion of the first set of coordinates.

6. The method of claim 1, wherein the first coordinate system is a coordinate system of a computer-aided design application, and wherein the second coordinate system is an Earth-Centered coordinate system.

7. The method of claim 1, wherein at least a portion of the plurality of coordinates are received from a database.

8. The method of claim 1, wherein generating pairs of coordinates from the first set of coordinates with coordinates from the second set of coordinates that represent positions for the same locations comprises generating three or more pairs of coordinates.

9. The method of claim 1, wherein generating pairs of coordinates is performed without user intervention.

10. An apparatus for converting coordinates of one coordinate system to another to, the apparatus comprising:
a processor configured to:
receive a first plurality of coordinates comprising a second plurality of coordinates representing positions for a plurality of locations associated with a Global Network Satellite System (GNSS) device, wherein the GNSS device is configured to convert GNSS signals from a plurality of GNSS satellites into the second plurality of coordinates;
separate the first plurality of coordinates into a first set of coordinates of a first coordinate system and a second set of coordinates of a second coordinate system;
generate pairs of coordinates from the first set of coordinates with coordinates from the second set of coordinates that represent positions for the same locations associated with the GNSS device;
convert at least a portion of the first set of coordinates into coordinates of the second coordinate system based on the paired coordinates; and
store the converted coordinates on the GNSS device.

11. The apparatus of claim 10, wherein separating the plurality of coordinates into the first set of coordinates and the second set of coordinates comprises evaluating the numerical values of the plurality of coordinates.

12. The apparatus of claim 11, wherein evaluating the numerical values of the plurality of coordinates comprises evaluating one or more of the sign of a first numerical value, the magnitude of the first numerical value, the unit associated with the first numerical value, and the value of the first numerical value relative to the value of a second numerical value.

13. The apparatus of claim 10, wherein converting at least a portion of the first set of coordinates into coordinates of the second coordinate system based on the paired coordinates comprises performing a localization process using the generated pairs of coordinates.

14. The apparatus of claim 10, wherein converting at least a portion of the first set of coordinates into coordinates of the second coordinate system is performed in response to a user request to convert the at least a portion of the first set of coordinates.

15. The apparatus of claim 10 wherein the first coordinate system is a coordinate system of a computer-aided design application, and wherein the second coordinate system is an Earth-Centered coordinate system.

16. The apparatus of claim 10, wherein at least a portion of the plurality of coordinates are received from a database.

17. The apparatus of claim 10, wherein generating pairs of coordinates from the first set of coordinates with coordinates from the second set of coordinates that represent positions for the same locations comprises generating three or more pairs of coordinates.

18. The apparatus of claim 10, wherein generating pairs of coordinates is performed without user intervention.

19. A computer implemented method for converting a first of set of coordinates from a first coordinate system to a second set of coordinates from a second coordinate system, the method comprising:
receiving, by a Global Network Satellite System (GNSS) device, GNSS signals from a plurality of GNSS satellites;
converting the GNSS signals into a first plurality of coordinates representing positions for a plurality of locations associated with the GNSS device;
receiving, by a processor, a second plurality of coordinates comprising the first plurality of coordinates representing positions for a plurality of locations associated with the GNSS device;
identifying at least three points within the first coordinate system and three points within the second coordinate system that have the same spacing and angles therebetween by determining the spacings between pairs of points within each coordinate system, determining the angles between sets of three points within each coordinate system, and comparing the spacings and angles;
converting the first set of coordinates to coordinates in the second coordinate system based on the identification; and
storing the converted coordinates on the GNSS device.

20. The method of claim 1, wherein generating pairs of coordinates from the first set of coordinates with coordinates from the second set of coordinates comprises:
generating at least a first subset of all possible shapes that can be generated using three or more locations represented by the first set of coordinates;
generating at least a second subset of all possible shapes that can be generated using three or more locations represented by the second set of coordinates;
identifying a first shape from the first subset of all possible shapes that match a second shape from the second subset of all possible shapes; and
pairing coordinates representing locations from the first shape with coordinates representing corresponding locations from the second shape.

21. The apparatus of claim 10, wherein generating pairs of coordinates from the first set of coordinates with coordinates from the second set of coordinates comprises:
generating at least a first subset of all possible shapes that can be generated using three or more locations represented by the first set of coordinates;
generating at least a second subset of all possible shapes that can be generated using three or more locations represented by the second set of coordinates;
identifying a first shape from the first subset of all possible shapes that match a second shape from the second subset of all possible shapes; and
pairing coordinates representing locations from the first shape with coordinates representing corresponding locations from the second shape.

* * * * *